United States Patent [19]
Nakayama et al.

[11] Patent Number: 6,124,078
[45] Date of Patent: Sep. 26, 2000

[54] PHOTO-DECOLORING DYE, A BINDER RESIN COMPOSITION CONTAINING THE SAME AND PHOTO-RECORDING MATERIAL

[75] Inventors: Noritaka Nakayama; Satomi Kawasaki, both of Hino, Japan

[73] Assignee: Konica Corporation, Tokyo, Japan

[21] Appl. No.: 09/266,041

[22] Filed: Mar. 11, 1999

[30] Foreign Application Priority Data

Mar. 17, 1998 [JP] Japan ................... 10-067093

[51] Int. Cl.$^7$ ............... G03C 5/56; G03C 1/73; G03C 5/16; G03C 1/74; G03C 7/02
[52] U.S. Cl. ............ 430/292; 430/270.18; 430/270.15; 430/334; 430/339; 430/346; 430/962
[58] Field of Search .................. 430/270.15, 270.18, 430/292, 334, 346, 945, 339, 271.1, 905, 962; 8/409

[56] References Cited

FOREIGN PATENT DOCUMENTS

| | | |
|---|---|---|
| 06080900 | 3/1994 | Japan . |
| 06100790 | 4/1994 | Japan . |
| 06106868 | 4/1994 | Japan . |

OTHER PUBLICATIONS

Miura et al. 1994: 617709, File HCAPLUS of STN Database SVC, Chemical Abstracts, American Chemical Society, 1994, pp. 10–14 English Abstract of JP 06106868, 1994.

Miura et al. 94–163663/20, On Line Derwent Abstract File WPAT, (English Abstract of JP06106868), 1994.

Miura et al. 94–106868, File JAPIO, (English Abstract of JP06106868), 1994,

Nakayama et al. 1994: 485716, File HCAPLUS of STN Database SVC. Chemical Abstracts, American Chemical Society, 1994, pp. 14–16 (English Abstract of JP 06080900), 1994.

Nakayama et al. 94–132202/16, on Line Derwent Abstract, File WPAT (English Abstract of JP06080900), 1994.

Nakayama et al. 94–080900, File JAPIO (English Abstract of JP06080900), 1994.

Komamura et al. 1994: 633068, File HCAPLUS of STN Database SVC, Chemical Abstracts, American Chemical Society, 1994, pp. 7–10 (English Abstract of JP06100790), 1994.

Komamura et al. 94–156809/19, On Line Derwent Abstract, File WPAT (English Abstract of JP06100790), 1994.

Komamura et al. 94–100790, File JAPIO (English Abstract of JP06100790), 1994.

*Primary Examiner*—Janet Baxter
*Assistant Examiner*—Sin J. Lee
*Attorney, Agent, or Firm*—Frishauf, Holtz, Goodman, Langer & Chick, P.C.

[57] ABSTRACT

A photo-decoloring dye represented by the following Formula (1),

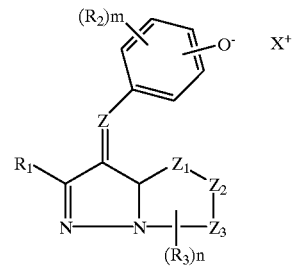

Formula (1)

wherein $Z_1$, $Z_2$ and $Z_3$ each represents a carbon atom or a nitrogen atom, $R_1$, $R_2$ and $R_3$ each represents a hydrogen atom and substituents, $Z_2$ and $Z_3$ may form a condensed ring, Z represents N or CH, X+ represents an organic cation, m represents an integer of 0 to 4, n represents an integer of 0 to 3.

11 Claims, No Drawings

PHOTO-DECOLORING DYE, A BINDER RESIN COMPOSITION CONTAINING THE SAME AND PHOTO-RECORDING MATERIAL

FIELD OF THE INVENTION

The present invention relates to a specified photo-decoloring dye, a binder resin composition containing said photo-decoloring dye, and a photo-recording material comprising said binder resin composition.

BACKGROUND OF THE INVENTION

As dyes usable for a use of photo-decoloring, a combination of a leuco dye or an azomethine dye with a acid generating agent is described in Japanese Patent Publication Open to Public Inspection (hereinafter referred to as JP-A) No. 5-10042, and an organic boric acid salt of a sensitizing dye is described in JP-A No.9-279081. Further, a guanidine salt dye of a pyrazolotriazole mother nucleus is disclosed in JP-A No. 5-96868.

SUMMARY OF THE INVENTION

The leuco dye is easily decolored by light, but its reservation in coloring state is not sufficient. The reservation of the azomethine dye is sufficient, but sufficient decoloring is not obtained without combined usage with the acid generating agent. The reservation of the sensitizing dye is not sufficient. The dyes disclosed in JP-A No. 5-96868 have low solubility in a binder resin resulting in precipitating in the binder resin so that these dyes can not provide sufficient color density. Accordingly, the first object of the present invention is to provide a novel dye having a high absorbing coefficient with an excellent photo-decoloring and reservation. The second object of the present invention is to provide a binder resin composition containing a photo-decoloring dye which is soluble in the binder resin composition in high concentration without precipitation. The third object of the present invention is to provide a photo-recording material comprising the binder resin composition layer containing the photo-decoloring dye on a support.

DETAILED DESCRIPTION OF THE INVENTION

Above objects of the invention could be attained by the following constitution:

1. A photo-decoloring dye represented by the following Formula (1),

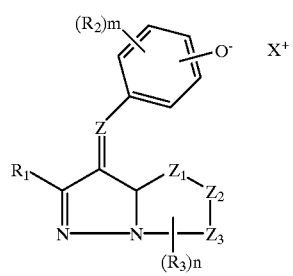

Formula (1)

wherein $Z_1$, $Z_2$ and $Z_3$ each represent a carbon atom or a nitrogen atom, $R_1$, $R_2$ and $R_3$ each represent a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3.

2. The photo-decoloring dye of item 1, wherein $Z_1$ and $Z_2$ represent a nitrogen atom, and $Z_3$ represents a carbon atom.

3. The photo-decoloring dye of item 1, wherein $Z_1$ and $Z_3$ represent a nitrogen atom, and $Z_2$ represents a carbon atom.

4. The photo-decoloring dye of item 1, wherein X represents a quaternary ammonium salt, an amidine salt, or a guanidine salt.

5. The photo-decoloring dye of item 1, wherein a molecular weight of X is 120 to 1000.

6. The photo-decoloring dye of item 1, wherein the sum of molecular weights of $R_1$, $R_2$ and $R_3$ is 150 to 1000.

7. A binder resin composition containing at least one photo-decoloring dye represented by the following Formula (1),

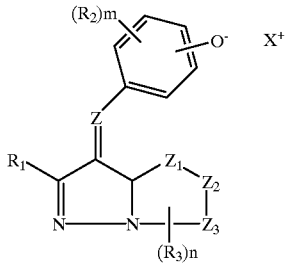

Formula (1)

wherein $Z_1$, $Z_2$ and $Z_3$ each represent a carbon atom or a nitrogen atom, $R_1$, $R_2$ and $R_3$ each represent a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3.

8. A photo-recording material comprising the binder resin composition containing the photo-decoloring dye represented by the following Formula (1),

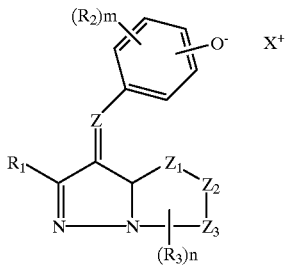

Formula (1)

wherein $Z_1$, $Z_2$ and $Z_3$ each represent a carbon atom or a nitrogen atom, $R_1$, $R_2$ and $R_3$ each represent a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3.

Next, the invention will be explained in detail.

In the photo-decoloring dye represented by the general Formula (1), $Z_1$, $Z_2$ and $Z_3$ represent atomic groups necessary to form a heterocyclic ring, and $Z_2$ and $Z_3$ may form a condensed ring together with each other. Concretely, $Z_1$, $Z_2$ and $Z_3$ each represent a carbon atom or a nitrogen atom, and from the viewpoint of decoloring, it is preferable that $Z_1$, $Z_2$ represent the nitrogen atom and $Z_3$ represents the carbon atom, or $Z_1$, $Z_3$ represent the nitrogen atom and $Z_2$ represents the carbon atom.

$R_1$, $R_2$ and $R_3$ each represent a hydrogen atom, a halogen atom and substituents. As a halogen atom, is cited a chlorine atom, a bromine atom and a fluorine atom. As examples of substituents, any substituents capable of bonding with a carbon atom or nitrogen atom can be employed, and are cited an alkyl group (for example, a methyl group, an ethyl group, an iso-propyl group, a hydroxyethyl group, a methoxymethyl group, a tri-fluoromethyl group, a t-butyl group, a 2-ethylhexyl group, etc.), a cycloalkyl group (for example, a cyclopentyl group, a cyclohexyl group, etc.), an aralkyl group (for example, a benzyl group, a 2-phenethyl group, etc.), an aryl group (for example, a phenyl group, a naphthyl group, a p-tolyl group, p-chlorophenyl group, etc.), an alkoxy group (for example, a methoxy group, an ethoxy group, an iso-propoxy group, a n-butoxy group, etc.), an aryloxy group (for example, a phenoxy group, etc.), a cyano group, an acylamino group (for example, an acetylamino group, a propionylamino group, etc.), an alkylthio group (for example, a methylthio group, an ethylthio group, a n-butylthio group, etc.), an arylthio group (for example, a phenylthio group, etc.), a sulfonylamino group (for example, a mathanesulfonylamino group, a benzenesulfonylamino group, etc.), an ureide group (for example, a 3-methylureide group, a 3,3-dimethylureide group, a 1,3-dimethylureide group, etc.), a sulfamoylamino group (for example, a dimethylsulfamoylamino group, etc.), a carbamoyl group (for example, a methylcarbamoyl group, an ethylcarbamoyl group, a dimethylcarbamoyl group, etc.), a sulfamoyl group (for example, an ethylsulfamoyl group, a dimethylsulfamoyl group, etc.), an alkoxycarbonyl group (for example, a methoxycarbonyl group, an ethoxycarbonyl group, etc.), an arloxycarbonyl group (for example, a phenoxycarbonyl group, etc.), a sulfonyl group (for example, a methanesulfonyl group, a butanesulfonyl group, a phenylsulfonyl group, etc.), an acyl group (for example, an acetyl group, a propanoyl group, a butyloyl group, etc.), an amino group (for example, a methylamino group, an ethylamino group, a dimethylamino group, etc.), an imide group (for example, a phthalimido group, etc.), a heterocyclic ring group (for example, a pyridyl group, a benzimidazolyl group, a benzthiazolyl group, a benzoxazolyl group, etc.). Further, these substituents may be substituted.

It is preferable that the sum of molecular weights of $R_1$, $R_2$ and $R_3$ is not less than 150 to increase solubility of the photo-decoloring dye in the binder resin and also preferable that the sum of molecular weights of $R_1$, $R_2$ and $R_3$ is not more than 1000 not to decrease an absorption coefficient per weight of a molecule of the photo-decoloring dye.

Especially, $R_2$ is preferably placed adjacent to $O^-$ group to stabilize a quaternary salt dye, and in this case, the substituent $R_2$ is preferably an electron-withdrawing group, more preferable one is a chlorine atom.

In the Formula (1), the $O^-$ group preferably places at the para-position relative to Z, and m is 0 to 4, n is 0 to 3.

As examples of organic cations represented by $X^+$, are cited a sulfonium cation, an oxonium cation and an ammonium cation, but an amidinium cation, a guanidinium cation and a quaternary ammonium cation are preferable. As examples of these cations, are cited amidine derivatives (for example, benzamidine, acetoamidine, 1,5-diazabicyclo(4, 3, 0)-5-nonene, 1,8-diazabicyclo(5, 4, 0)-7-undecene, etc.), guanidine derivatives (for example, tetramethylguanidine, diphenylguanidine, dimethyldiphenylguanidine, dipiperidinoguanidine, bisguanidine, etc.), quaternary ammonium cation derivatives such as tetramethylammonium cation, tetraethylammonium cation, trimethylbenzylammonium cation and tetrabutylammonium cation, etc.

Representative examples of the ammonium cations and the cations represented by $X^+$ are shown below, but are not limited thereto.

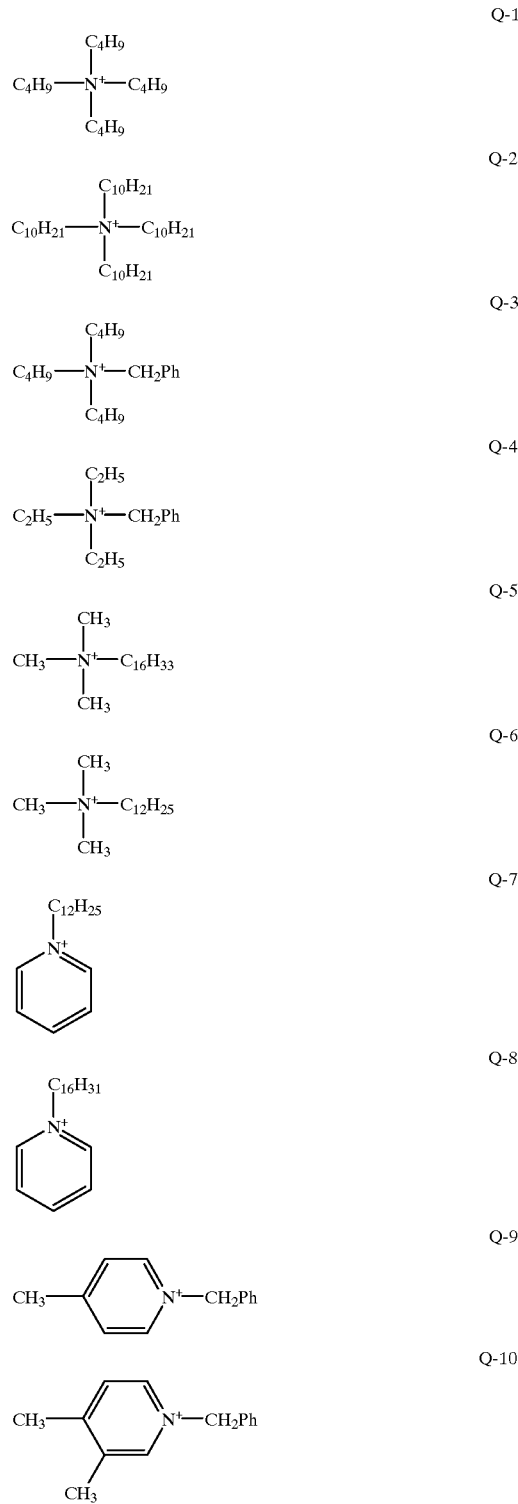

Q-11 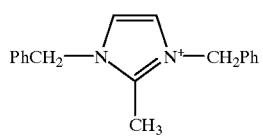
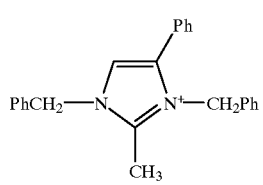
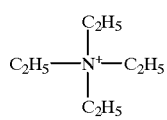
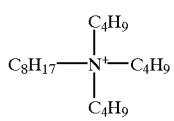
A-1 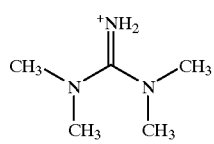
A-2 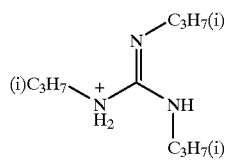
A-3 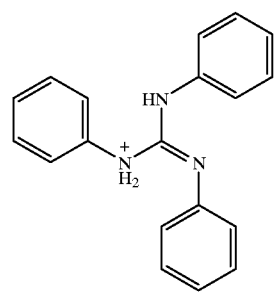
A-4 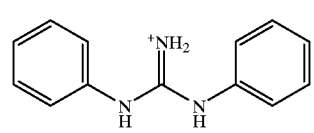
A-5 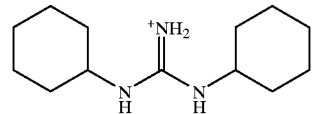
A-6 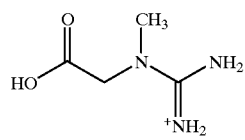
A-7 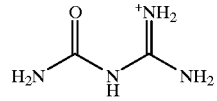
A-8 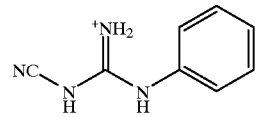
A-9 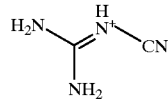
A-10 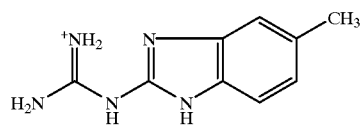
A-11 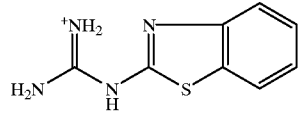
A-12 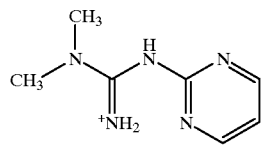
A-13 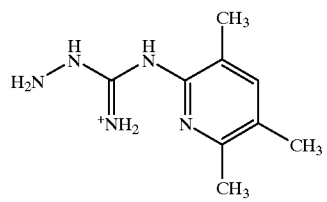
A-14 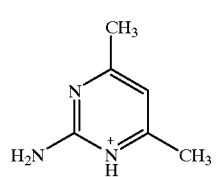
A-15

-continued
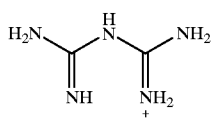
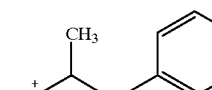
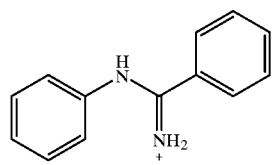
H₂N⁺(C₈H₁₇)₂
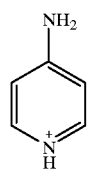
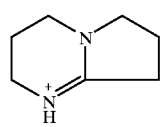
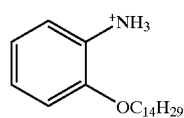
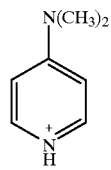
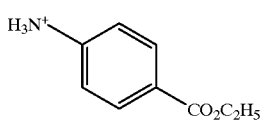
H₂NCH₂CH₂N⁺H₃
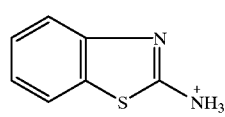
H₃N⁺CH₂CH₂OCOCH₃
-continued
A-16 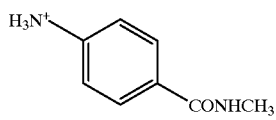
A-17
A-18 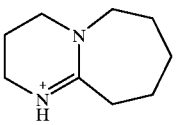
A-19 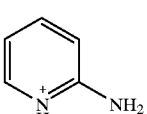
A-20 (C₈H₁₇)₃N⁺H
A-21 (C₂H₅)₂HN⁺─phenyl
A-22 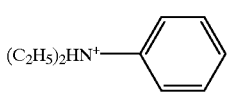
A-23 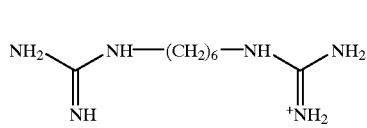
A-24
A-25 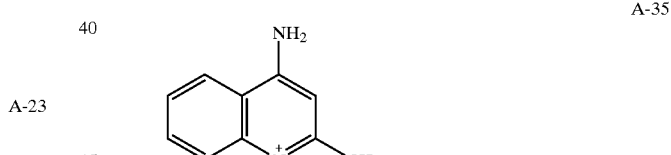
A-26
A-27
A-28
A-29
A-30
A-31 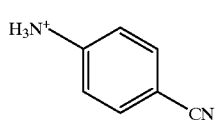
A-32
A-33
A-34
A-35 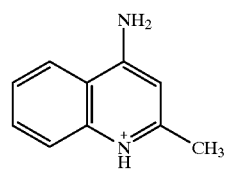
A-36
A-37 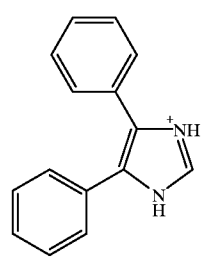

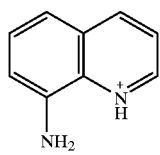
A-38
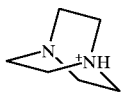
A-41
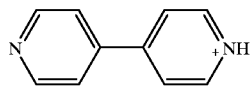
A-39
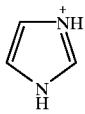
A-42
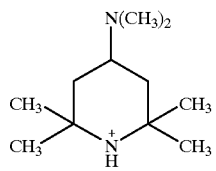
A-40
Next, examples of the photo-decoloring dyes represented by the Formula (1) are shown below, but are not limited thereto.
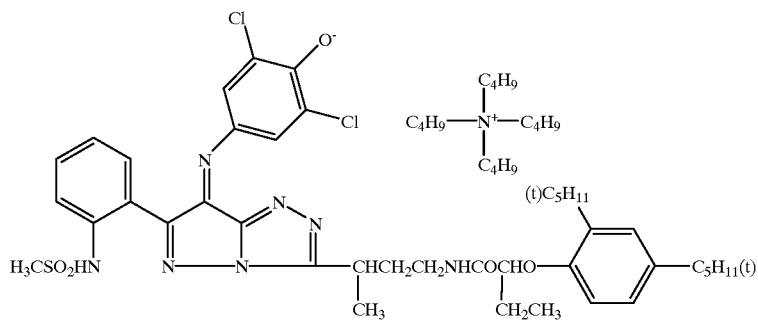
1
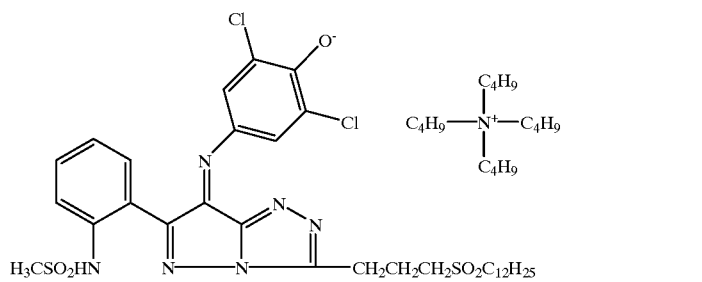
2
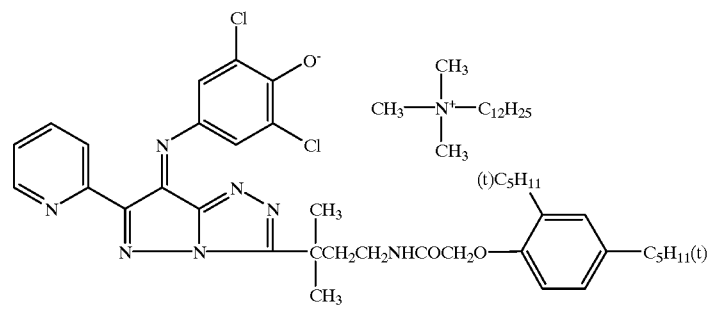
3

-continued
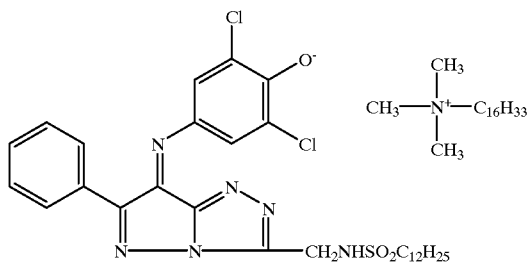
4
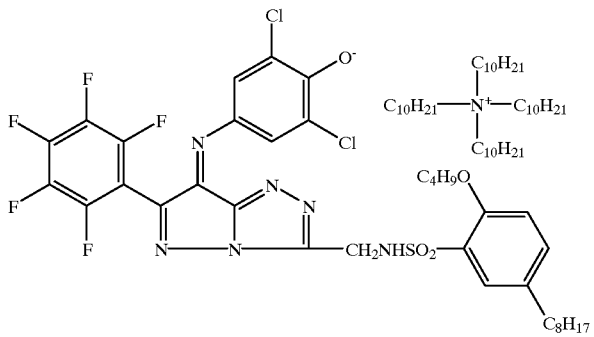
5
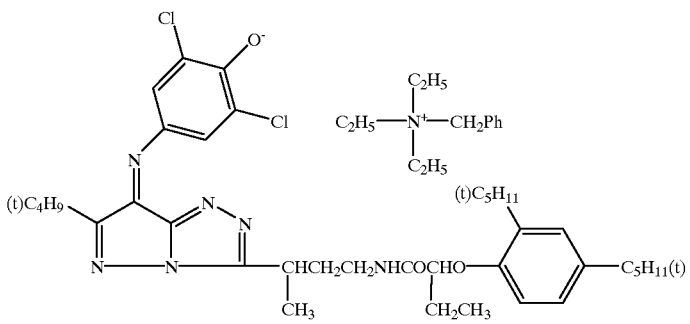
6
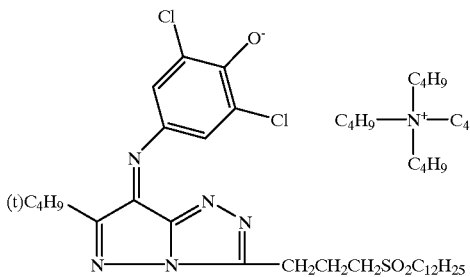
7
The sum of molecular weights of X + R₁ + R₂ + R₃ = 645.95
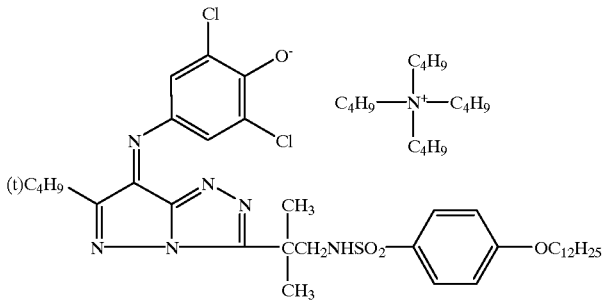
8

-continued
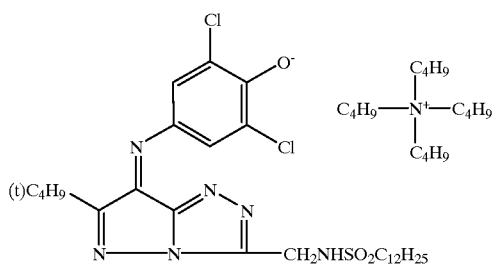
9
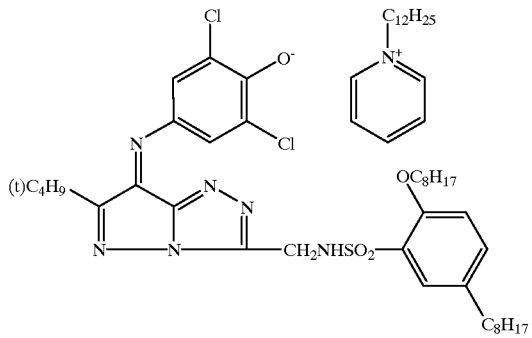
10
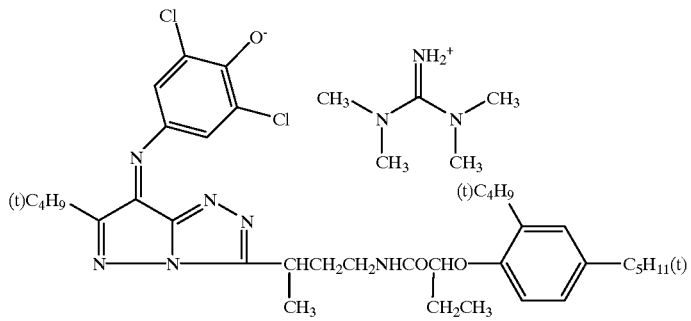
The sum of molecular weights of X + R₁ + R₂ + R₃ = 618.78
11
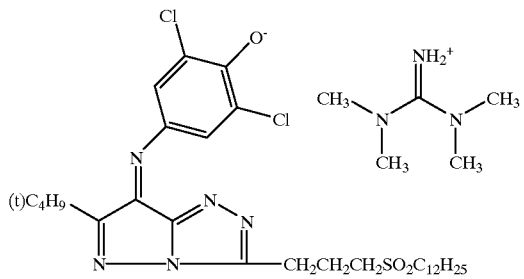
12
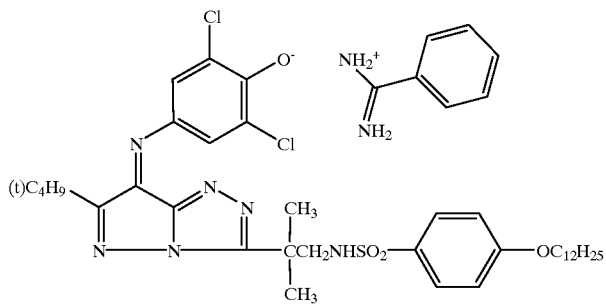
The sum of molecular weights of X + R₁ + R₂ + R₃ = 645.79
13

-continued
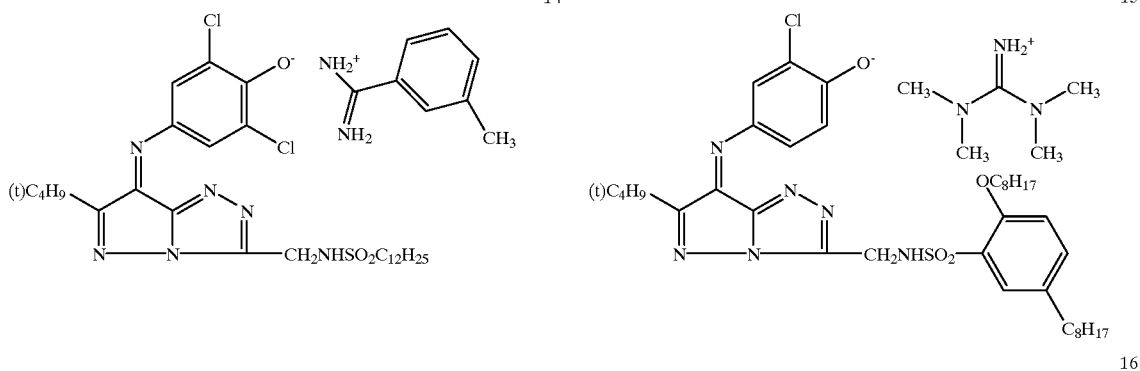
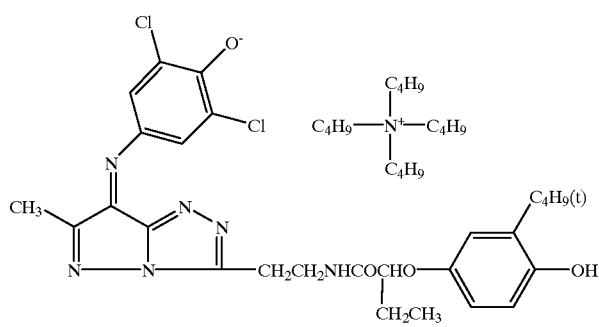
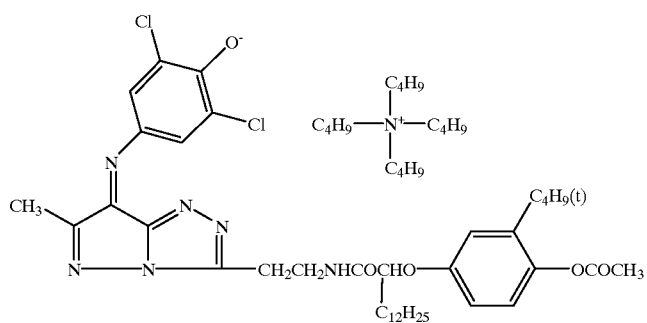
The sum of molecular weights of X + R$_1$ + R$_2$ + R$_3$ = 819.14
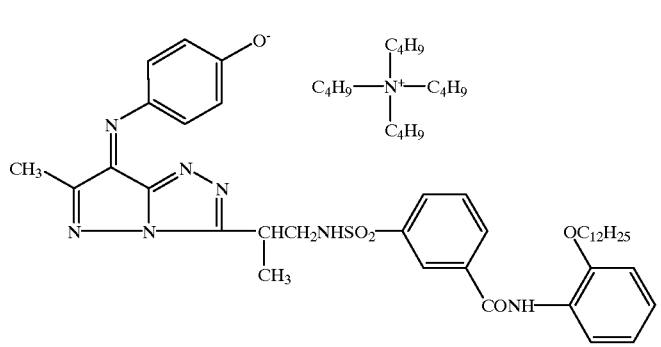
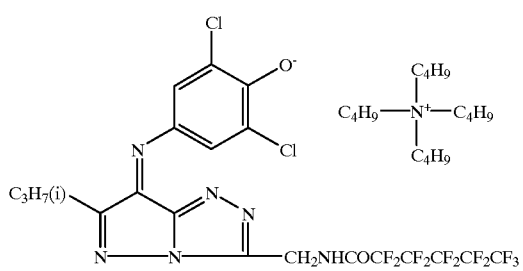

20
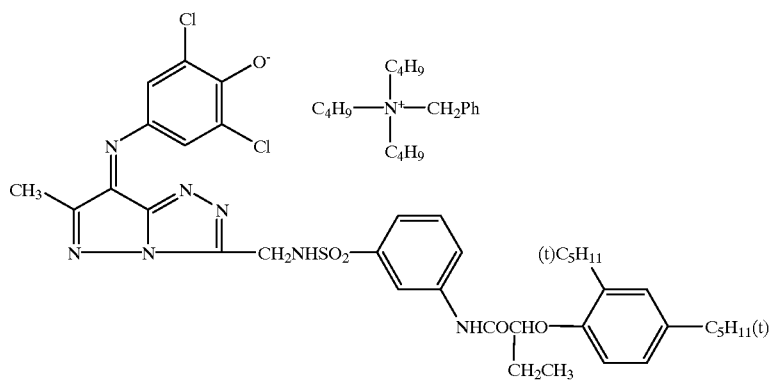
21
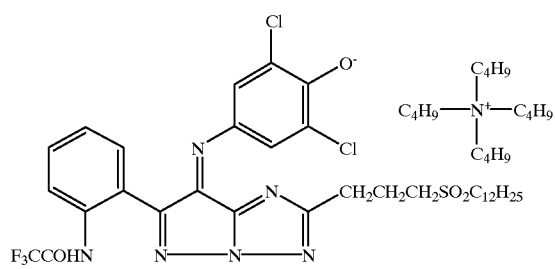
22
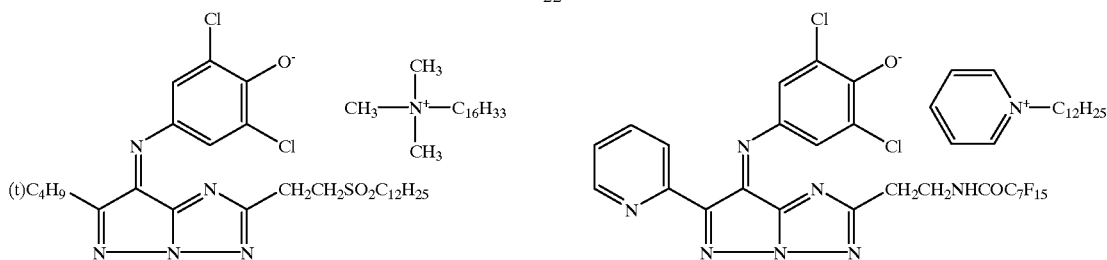
The sum of molecular weights of X + R₁ + R₂ + R₃ = 689.02
23
24
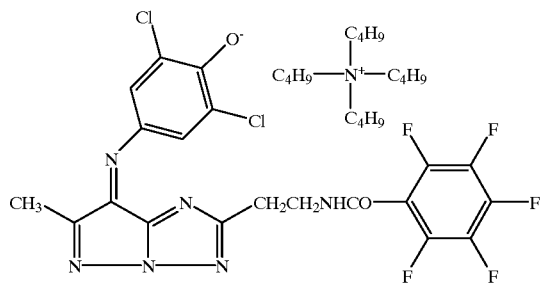
25
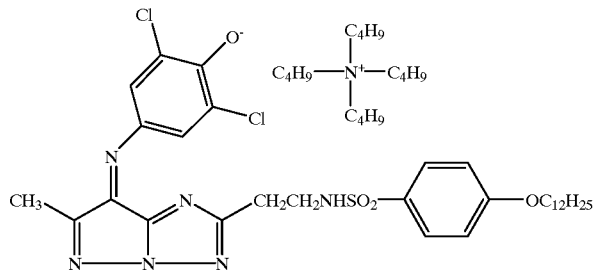

26
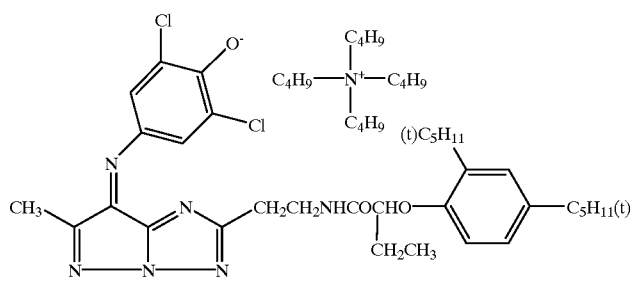
27
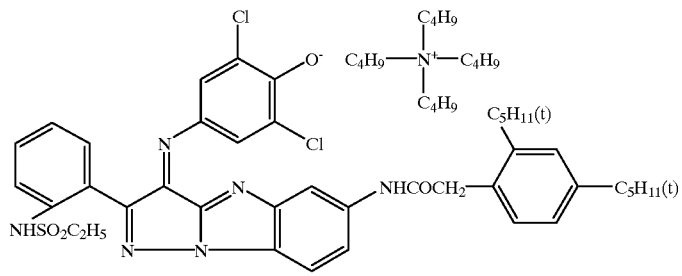
28
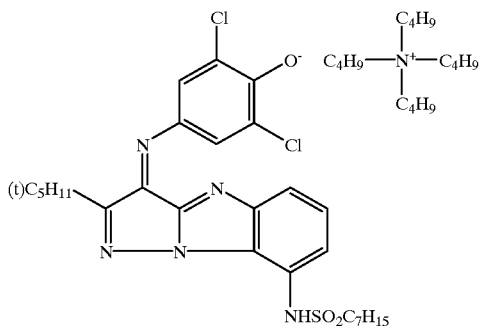
29
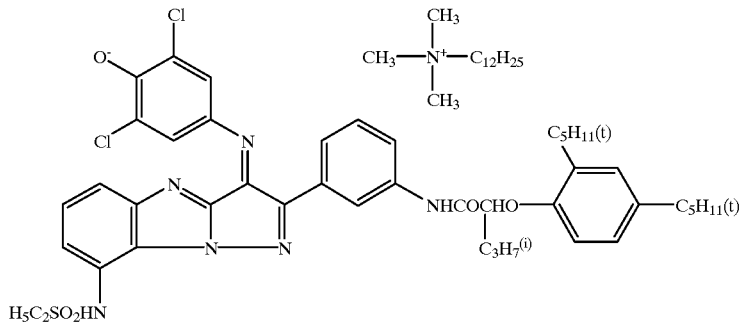
30
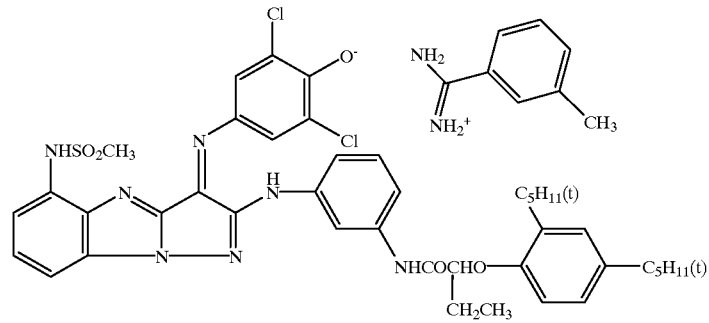

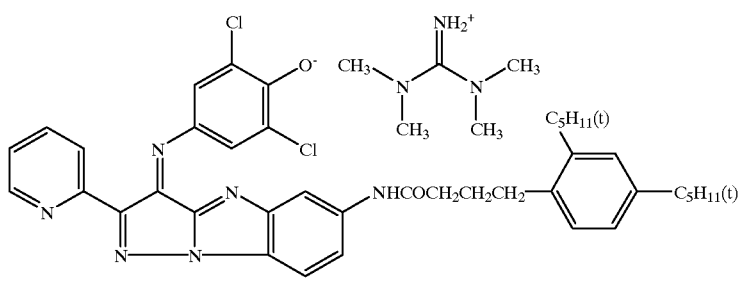
31
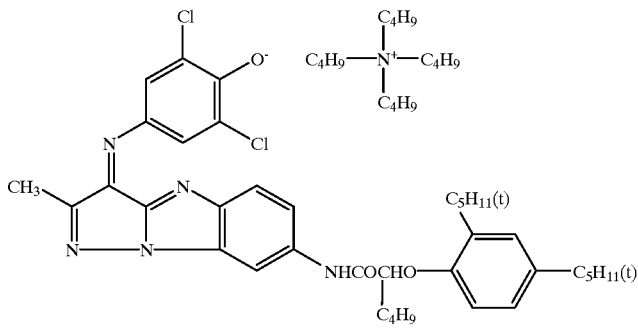
The sum of the molecular weights of $X + R_1 + R_2 + R_3 = 674.93$
32
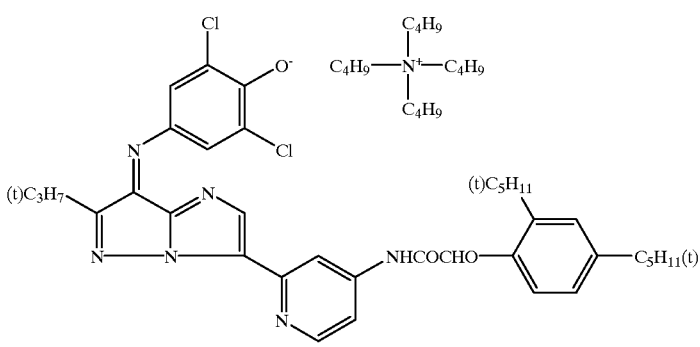
The sum of the molecular weights of $X + R_1 + R_2 + R_3 = 737.99$
33
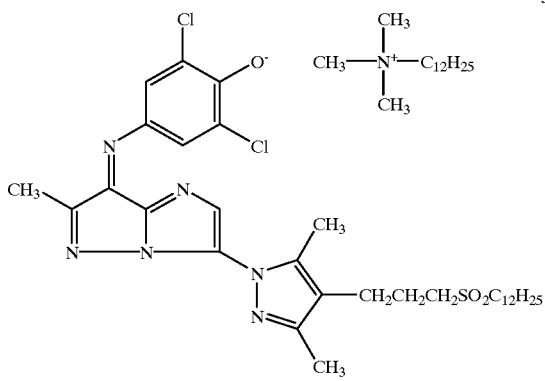
34
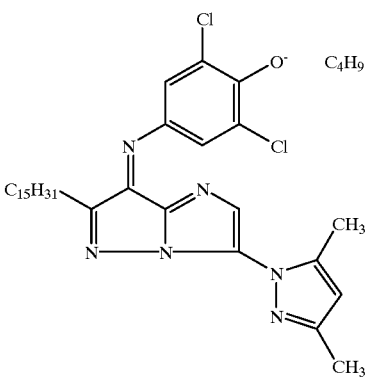
35

36
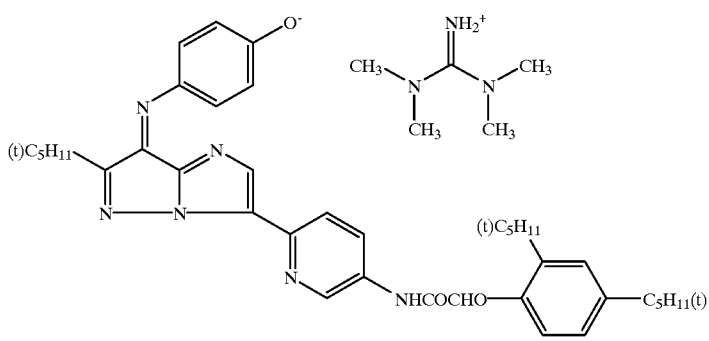
37
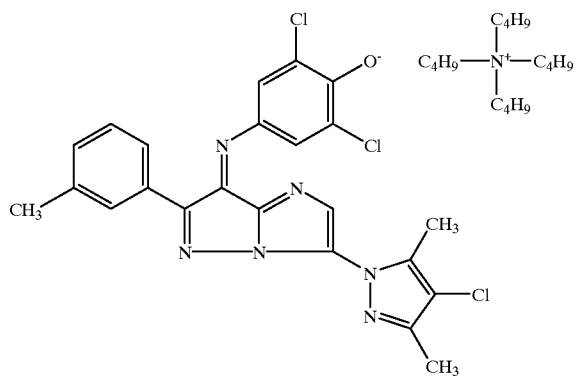
38
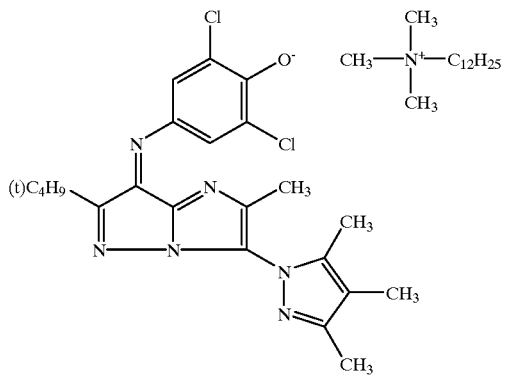
39
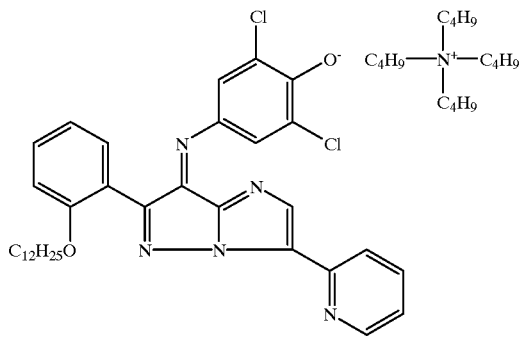
40
41
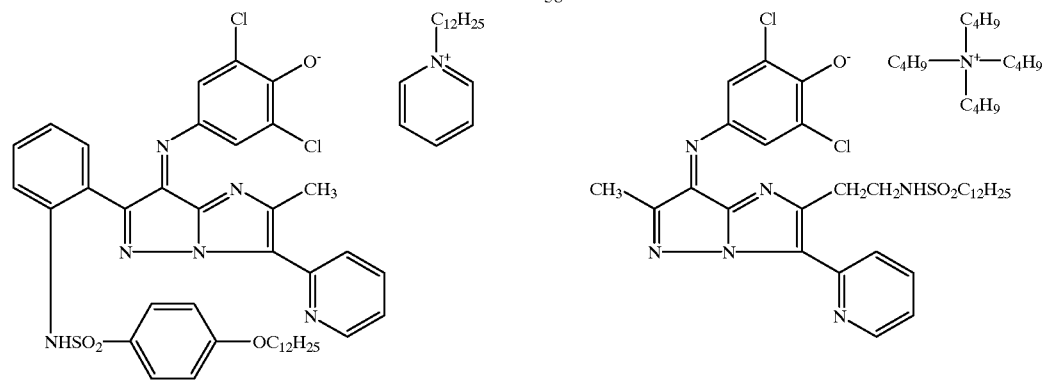

-continued
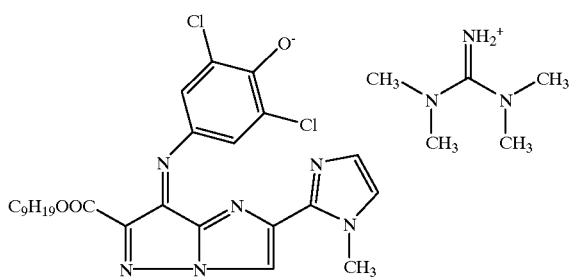
42
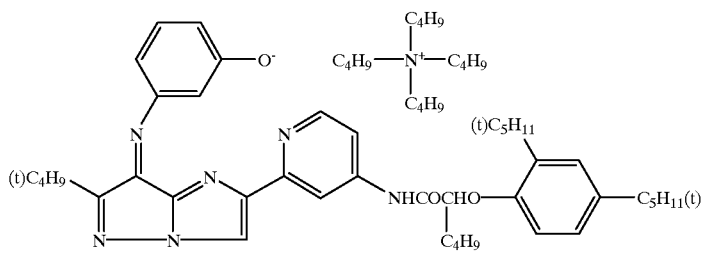
43
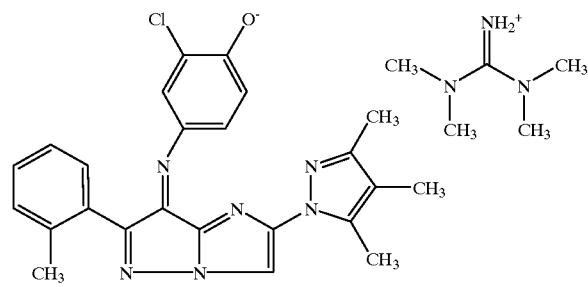
44
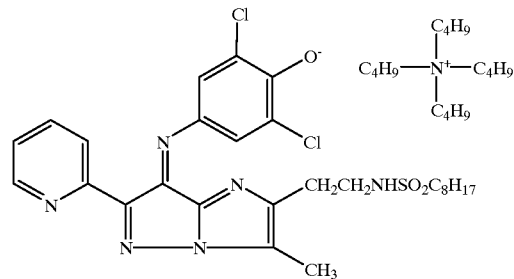
45
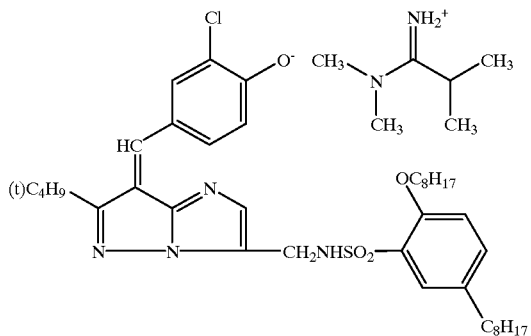
46
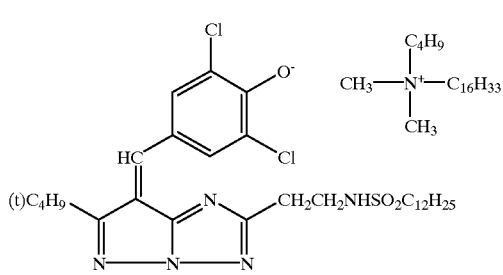
The sum of molecular weights of X + R$_1$ + R$_2$ + R$_3$ = 689.02
47
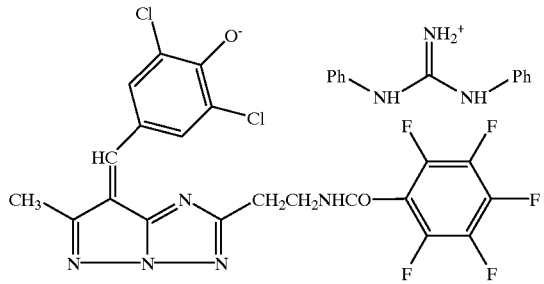
48

49
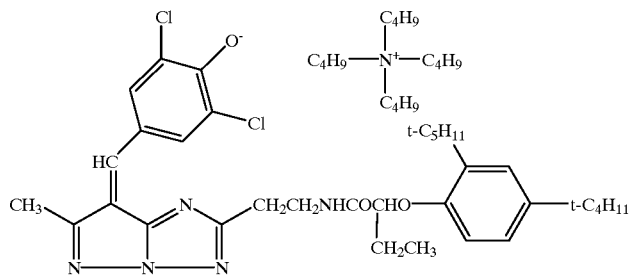
50
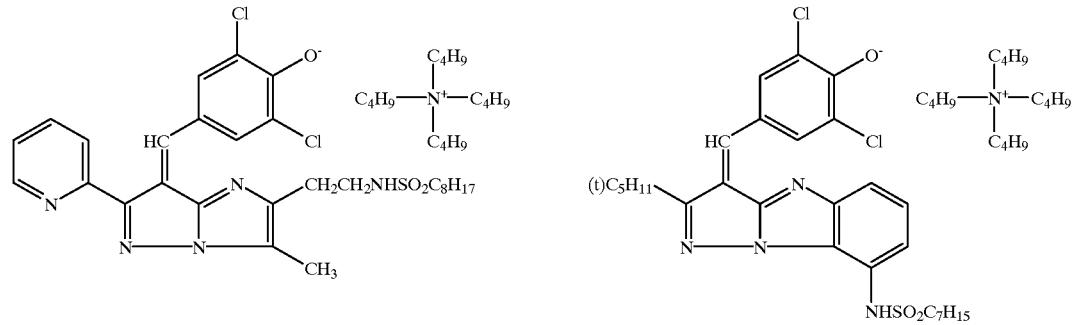
51
52
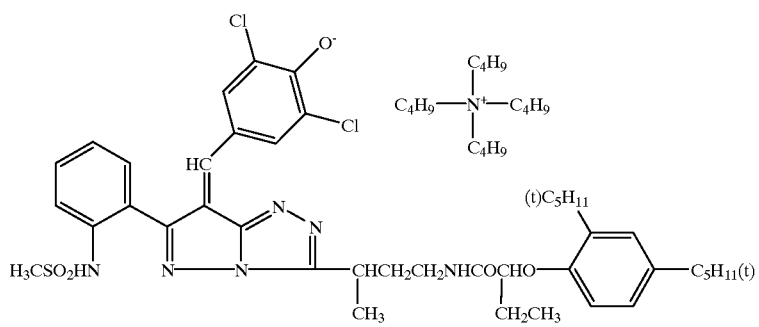
53
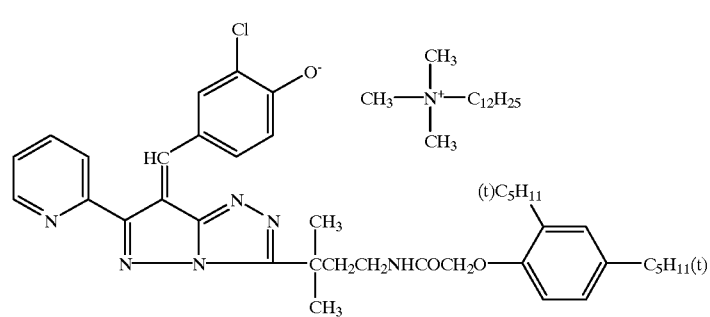
54
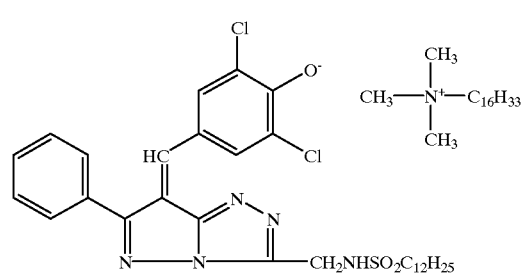

55
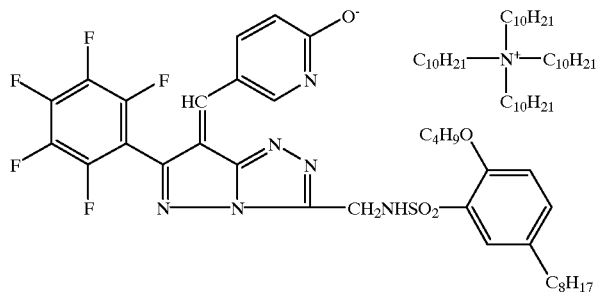
56
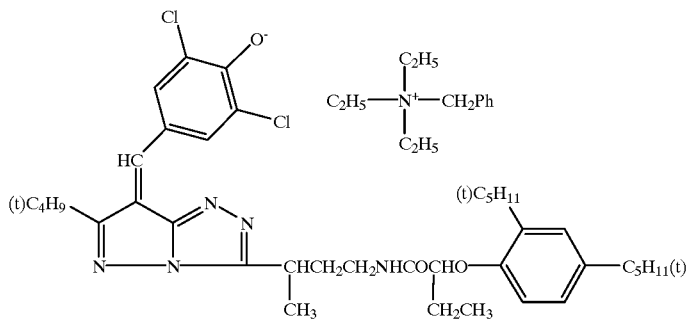
57
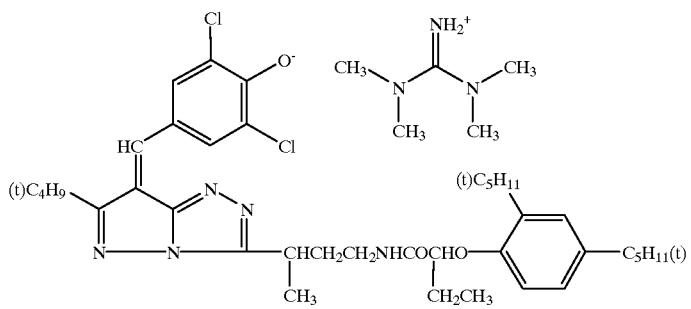
58
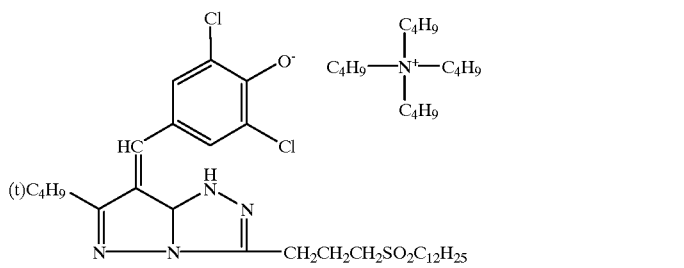
The sum of the molecular weights of X + R$_1$ + R$_2$ + R$_3$ = 645.95
59
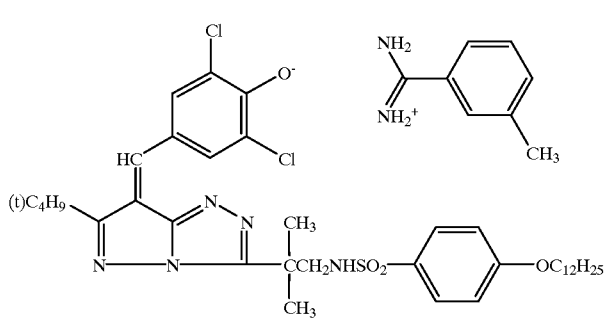

-continued
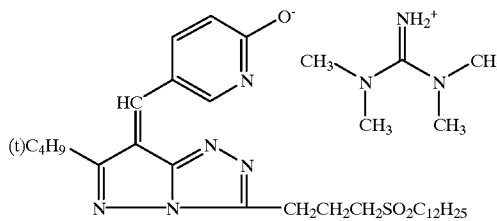
60
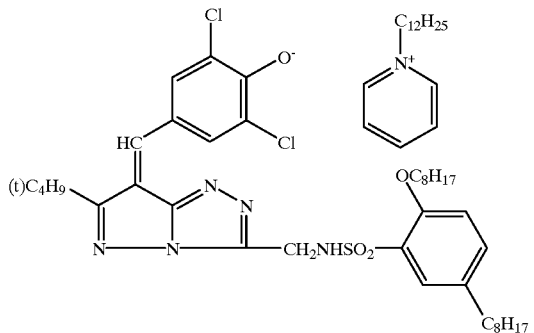
61
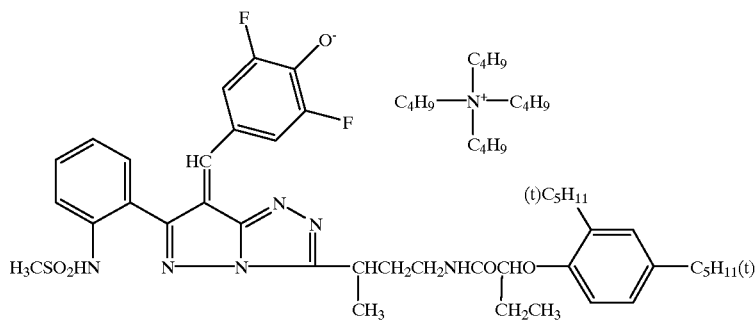
62
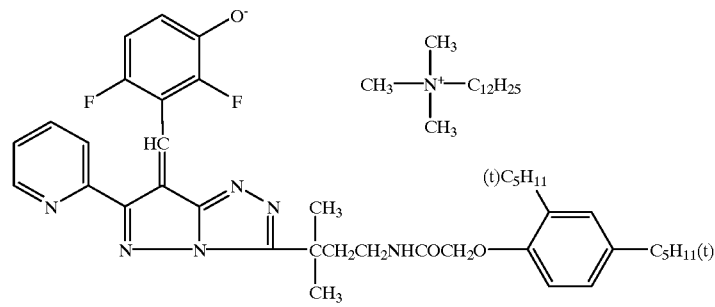
63
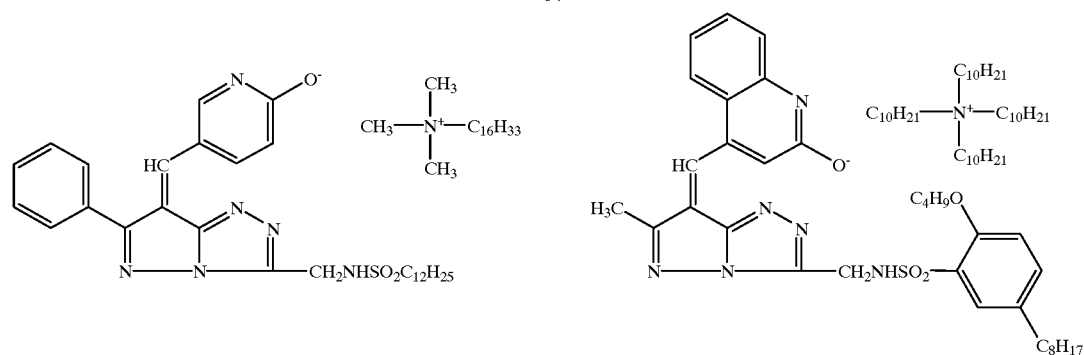
64 65

-continued
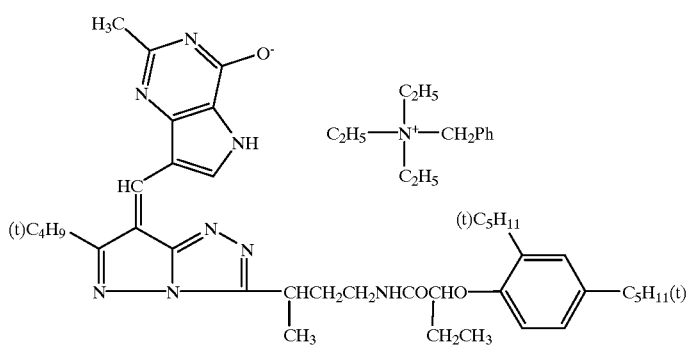
66
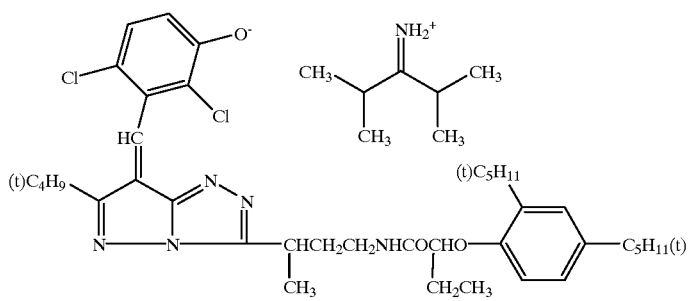
67
The sum of the molecular weights of $X + R_1 + R_2 + R_3 = 618.78$
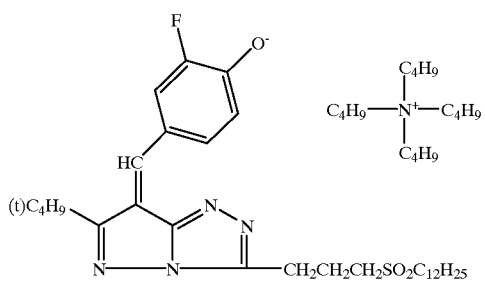
68
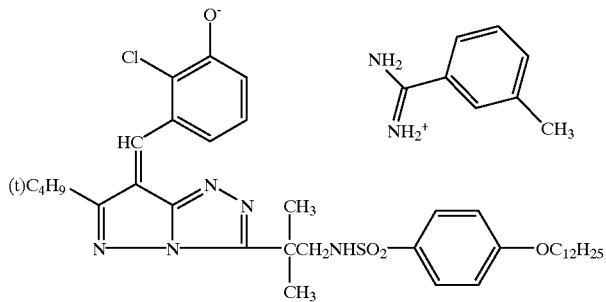
69
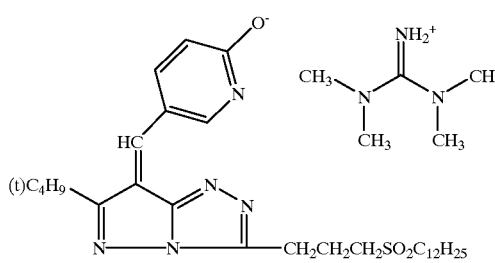
70
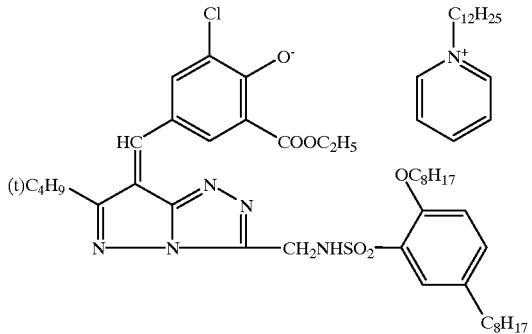
71

-continued
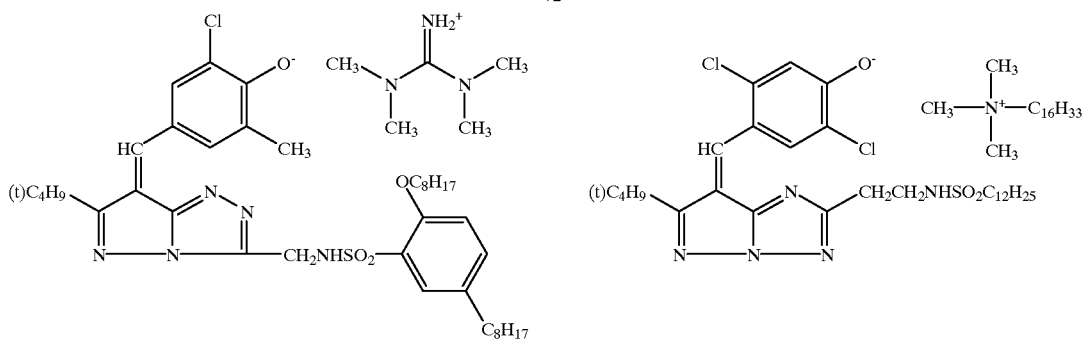
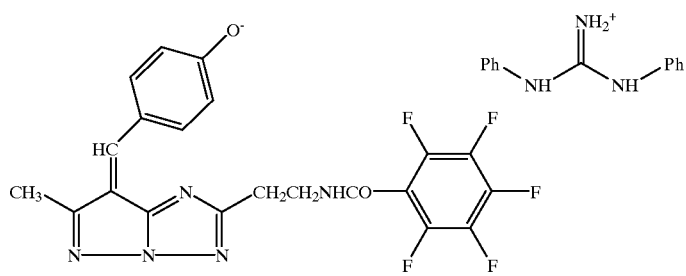
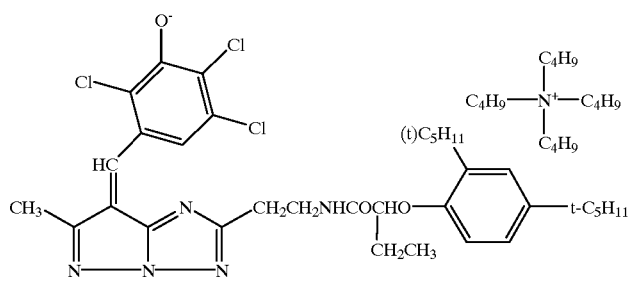
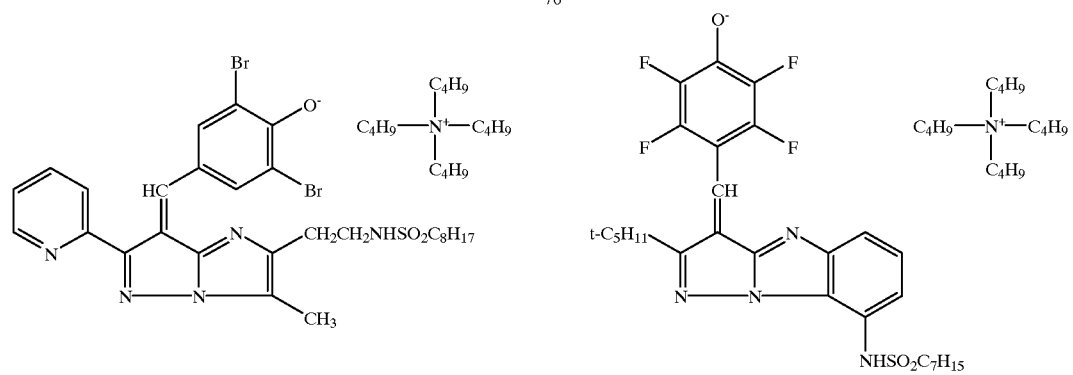
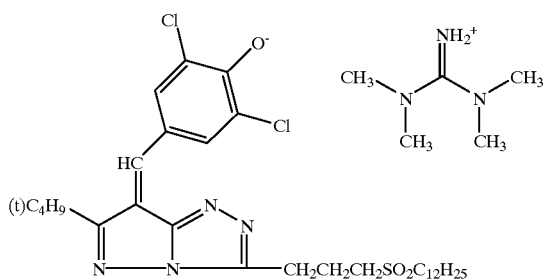

The photo-decoloring dyes represented by the Formula (1) used in the invention can be easily synthesized by reacting various couplers known as color forming agents for a photographical use with amino substituted aromatic derivatives or aldehyde substituted aromatic derivatives, thereafter by forming salts. The photo-decoloring dye means the dye characterized in that the main absorption density in a visible region of said photo-decoloring dye decreases when exposed to an irradiation of ultraviolet ray or visible ray.

A binder resin composition containing the photo-decoloring dye according to the invention can be obtained by dissolving said dye in the binder resin, if necessary, by adding said dye to the binder resin after dissolving said dye in a solvent. With respect to usable solvents, the solvents which are miscible with both the binder resin and the photo-decoloring dye according to the invention can be employed. As generally usable solvents, are cited ketone derivatives (for example, acetone, methyl ethyl ketone, methyl isopropyl ketone, etc.), alcohol derivatives (for example, methyl alcohol, ethyl alcohol, isopropyl alcohol, etc.), cellosolve derivatives (for example, methyl cellosolve, etc.), ester derivatives (for example, ethyl acetate, ethyl lactate, etc.), aromatic derivatives (for example, toluene, xylene, chlorobenzene, etc.), ether derivatives (for example, tetrahydrofuran, dioxane, etc.), and chlorine type solvents (for example, chloroform, trichloroethylene, etc.).

In the case of dissolving the photo-decoloring dye according to the invention in the binder resin, it is impossible to obtain a sufficient color density with a small adding amount of the photo-decoloring dye, whereas a large adding amount of the photo-decoloring dye brings precipitation of the photo-decoloring dye or decrease in photo-decoloring efficiency. Therefore, it is preferable to add the photo-decoloring dye in 0.01 to 10 wt % to the binder resin, more preferably 0.05 to 5 wt %.

As the binder resin mentioned above, are cited water soluble polymers such as cellulose type, polyacrylic acid type, polyvinyl alcohol type, polyvinyl pyrrolidone type, etc., and organic solvent soluble polymers such as acryl resin, methacryl resin, silicone resin, polystyrene, polycarbonate, polysulfone, polyethersulfone, ethylcellolose, etc., and the organic solvent soluble polymers are preferably used. In the case of using the organic solvent soluble polymer, the polymer is dissolved in the organic solvent so as to be used but it may be used in the form of latex dispersion.

The photo-recording material according to the invention is obtained by preparing a resin composition containing the photo-decoloring dye, then coating said resin composition on a support and drying the resulting coated material.

As a support, any support with good dimentional stability which endures a light irradiation when recording can be used, and preferably used are a thin leaf paper such as a condenser paper, a glacine paper, etc., and a heat-resisting plastic film such as a polyethyleneterephthalate, a polyamide, a polycarbonate, etc.

A thickness of the support is preferably 2 to 30 μm. The support is preferably treated with a subbing layer comprising a polymer selected for the purpose of improving the adhesion ability of the above mentioned photo-decoloring binder resin composition to the support and preventing dyeing of the photo-decoloring dye to the support. Further, on the backing side (opposite to a photo-sensitive layer) of the support may be coated a slipping layer for the purpose of preventing adhering of the surface of the photo-recording material of the invention to the support of another photo-recording material when they are superposed and preventing an abrasion, and a protective layer may be coated on the resin composition layer containing said photo-decoloring binder dye for the same purpose as mentioned above.

An using amount of the photo-decoloring dye according to the invention is preferably 0.05 to 10 $g/m^2$ of the support.

When the photo-recording material according to the invention is recorded, after superposing a mask on the photo-recording material, said photo-recording material is exposed to ultraviolet radiation, or subjected to a scanning exposure of a He—Ne laser beam light so as to record an optional information. In this case, a portion which is exposed to the light photo-decolors so that a positive image can be obtained.

EXAMPLES

The present invention is further explained based on examples, but embodiments of the present invention are by no means limited to these examples.

Example 1

—Synthesizing the Photo-decoloring Dye 7 According to the Invention—

15.02 g of 2,6-dichloro-4-aminophenol and 25.82 g of 6-tert-butyl-7-chloro-3-(3-dodecylsulfonylpropyl)-1H-pyrazolo[3,2-c][1,2,4]triazole were dissolved in 650 ml of methyl alcohol. To the resulting mixture was added an aqueous solution of potassium carbonate (38.86 g of potassium carbonate dissolved in 60 ml of water) and was added separately prepared aqueous solution of ammonium persulfate (19.39 g of ammonium persulfate dissolved in 36 ml of water).

After the mixture was stirred for 90 min., the resultant reaction solution was poured into 1000 ml of water so that solid crystals were produced. The produced solid crystals were collected by filtration and sufficiently washed with water and then dried so as to obtain 27.30 g (a yield of 81.7%) of brilliant greenish powdery crystals.

14.88 g of the above obtained crystals was suspended in 110 ml of ethyl acetate and to this suspension were added 3.35 g of tetramethylguanidine and 11.75 g of tetrabutylammoniumbromide. The resultant ethyl acetate solution was washed with a saturated aqueous solution of salt, then washed with water, thereafter dried with $MgSO_4$, and then ethyl acetate was removed by evaporation under a reduced pressure.

Thus obtained oily residue was poured into hexane so that solid crystals were produced. The produced solid crystals were collected by filtration and dried up so as to obtain 19.91 g (a yield of 96%) of the photo-decoloring dye 7 in reddish brown powder form with λmax=556 nm and εmax=93700 (in ethyl acetate), melting point of 94° C. The chemical structure of thus obtained photo-decoloring dye 7 was confirmed by NMR and mass-spectrum thereof.

Example 2

—Synthesizing the Photo-decoloring Dye 78 According to the Invention—

11.5 g of 3,5-dichloro-4-hydroxybenzaldehyde, 23.65 g of 6-tert-butyl-7-chloro-3-(3-dodecylsulfonylpropyl)-1H-pyrazolo[3,2-c][1,2,4]triazole and 12 ml of piperidine were added to 150 ml of toluene and the mixture was refluxed for 3 hours. Thereafter the resultant mixture was cooled down to room temperature so that red crystals were precipitated. Thus obtained crystals were recrystallized from ethyl alcohol so that 28.2 g (a yield of 70.5%) of the red crystals was obtained.

14.87 g of the above obtained crystals was suspended in 110 ml of ethyl acetate and to this suspension was added 3.35 g of tetramethylguanidine. The resultant ethyl acetate solution was washed with a saturated aqueous solution of salt, then washed with water, thereafter dried with MgSO$_4$, and then ethyl acetate was removed by evaporation under a reduced pressure so that 18.21 g (a yield of 100%) of the photo-decoloring dye 78 in red amorphous state with λmax= 543 nm and εmax=94800 (in ethyl acetate). The chemical structure of thus obtained photo-decoloring dye 78 was confirmed by NMR and mass-spectrum thereof.

Example 3

—Synthesizing the Photo-decoloring Dye 58 According to the Invention—

The photo-decoloring dye 78 (18.21 g) ob taine d above was suspended in 100 ml of ethyl acetate and to this suspension was added 11.75 g of tetrabutylammoniumbromide. The resultant ethyl acetate solution was washed with a saturated aqueous solution of salt, then washed with water, thereafter dried with MGSO$_4$, and then ethyl acetate was removed by evaporation under a reduced pressure so that an oily product was obtained. Further, by drying the oily product under a reduced pressure, 17.8 g (a yield of 86%) of the photo-decoloring dye 58 in red amorphous state with λmax=540 nm and εmax=105300 (in ethyl acetate). The chemical structure of thus obtained photo-decoloring dye 58 was confirmed by NMR and mass-spectrum thereof.

Representative synthesizing examples of the photo-decoloring dyes were described above and other decoloring dyes except for the decoloring dyes described in example 1 to 3 can be synthesized in the same manner.

Example 4

(Preparing a Composition of a Binder Resin Containing the Photo-decoloring Dye)

Mixing the following raw materials, a binder resin composition containing the photo-decoloring dye was prepared so as to obtain sample 3-1.

| | |
|---|---|
| Photo-decoloring dye 7 | 0.3 mmol |
| Polyvinyl butyral resin (Esrex BX-1) | 100 mg |
| Methyl ethyl ketone | 3.0 ml |

Samples 3-2 to 3-12 were obtained in the same way in which sample 3-1 was obtained except replacing the photo-decoloring dye 7 by the following dyes described later. Solubility was evaluated by varying addition amount of each dye. Obtained result is shown below. The dyes except for comparative dyes show the photo-decoloring dyes according to the invention. The chemical structures of the comparative dyes A and B (these dyes are used in example 5) are shown below.

Comparative Dye A:

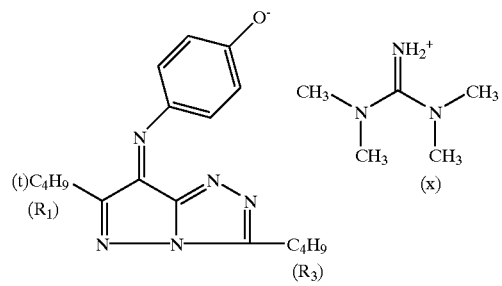

The sum of molecular weights of X+R$_1$+R$_2$+R$_3$: 230.41 (Without R$_2$)

Comparative Dye B:

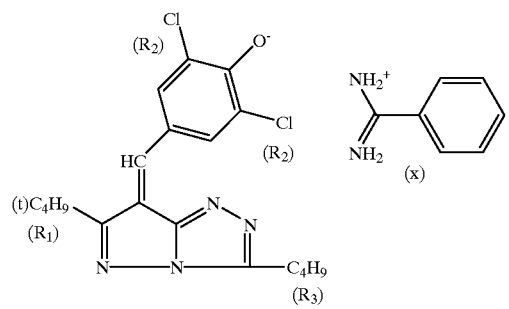

The sum of molecular weights of X+R$_1$+R$_2$+R$_3$: 235.39

Evaluation Method:

After preparing binder resin compositions in which addition amount of the photo-decoloring dyes was increased in serial turn, said binder resin compositions were aloowed to stand under the condition of shielding a light for a day at 15° C. When slight precipitation of the photo-decoloring dyes in said binder resin compositions was observed, the solubility of said photo-decoloring dyes was evaluated as unacceptable.

The solubility of the photo-decoloring dyes was evaluated based on the following criteria in response to the addition amount of said photo-decoloring dyes.

1: Slight precipitation was observed in an addition amount of less than 0.3 mmol.
2: Slight precipitation was observed in an addition amount of not less than 0.3 to less than 0.6 mmol.
3: Slight precipitation was observed in an addition amount of not less than 0.6 to less than 0.9 mmol.
4: Precipitation was not observed in an addition amount of not less than 0.9 mmol.

| Sample No. | Dye | Solubility | Remarks |
|---|---|---|---|
| 3-1 | 7 | 4 | Invention |
| 3-2 | 11 | 4 | Invention |
| 3-3 | 13 | 3 | Invention |
| 3-4 | 17 | 4 | Invention |
| 3-5 | 22 | 4 | Invention |
| 3-6 | 32 | 3 | Invention |
| 3-7 | 33 | 4 | Invention |
| 3-8 | 47 | 4 | Invention |
| 3-9 | 58 | 4 | Invention |
| 3-10 | 67 | 3 | Invention |

-continued

| Sample No. | Dye | Solubility | Remarks |
|---|---|---|---|
| 3-11 | A | 2 | Comparison |
| 3-12 | B | 2 | Comparison |

Further, the binder resin was replaced by polyester resin (Biron 200), styrene resin (ABS-900), acryl resin (Dianal BR-64), epoxy resin (Epotote YD-020N), and poly carbonate resin (Upiron PCZ 200), and the solubility of the photo-decoloring dyes according to the invention in the above mentioned resins showed excellent.

Example 5
(Preparing a Photo-recording Material)

The binder resin composition containing the photo-decoloring dye used for making sample 3-1 was coated on a polyethylenenaphthalate base having thickness of 4.0 μm by using a wire bar in a coating amount of 2.5 g/m² after drying so as to obtain a photo-recording material consisting of a photo-decoloring layer on the polyethylenenaphthalate film. On a back side of said polyethylenenaphthalate base was coated a nitrocellulose layer containing a silicone modified urethane resin (SP-2105, produced by Dainichiseika Co., Ltd.) as a sticking-preventing layer. Thus obtained sample is termed sample 4-1.

By replacing the photo-decoloring dye 7 used in sample 4-1 by such photo-decoloring dyes as described later, sample 4-2 to 4-16 were obtained. Both photo-decoloring ability and storage stability of these dyes were evaluated. The obtained results are shown below.

Chemical structures of comparative dyes, C, D, E and F (azomethine dyes described in JP-A 5-10042, a sensitizing dye described in JP-A 9-279081) are shown below.

Comparative dye C
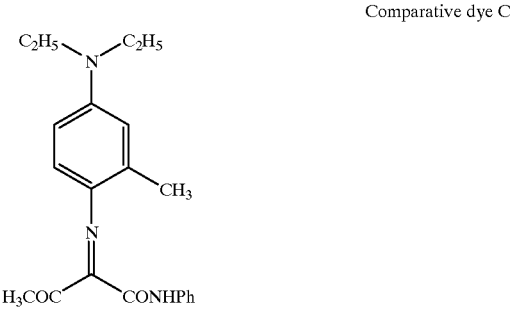

Comparative dye D
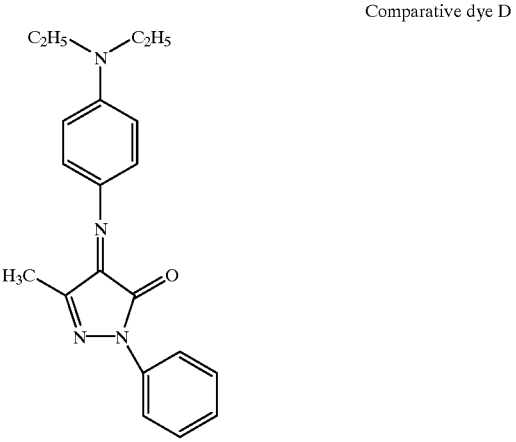

Comparative dye E
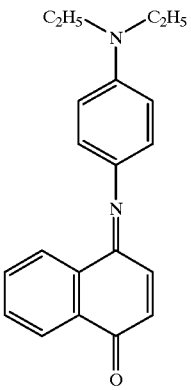

Comparative dye F
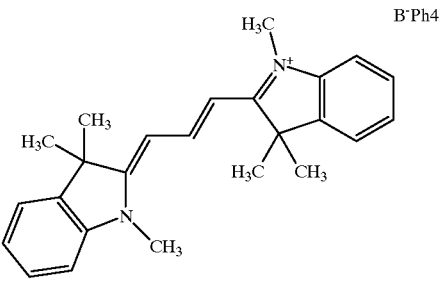

Evaluation Method
(Photo-decoloring Ability):

The above obtained photo-recording materials were exposed to ultraviolet rays by using UGRA plate control wedge PCW 82 (produced by Mika Electron Co., Ltd.). An exposed amount of ultraviolet rays was adjusted so that sample 4-1 photo-decolored at the eighth step. The same amount of ultraviolet rays was given to the other samples 4-2 to 4-16 and evaluation was carried out by counting the step where the samples photo-decolored. With higher step where the samples photo-decolor, the photo-recording materials are excellent in photo-decoloring ability.

Evaluation Method
(Storage Stability):

Photo-shielded samples by packing them with black paper were allowed to stand at 60° C. in a thermostatic oven for 200 hours. Storage stability was indicated as follows.

Storage stability=(density after storage/initial density)× 100 (%)

| Sample No. | Dye | Photo-decoloring ability | Storage stability (%) | Remarks |
|---|---|---|---|---|
| 4-1 | 7 | 8 | 88 | Invention |
| 4-2 | 11 | 7 | 80 | Invention |
| 4-3 | 13 | 7 | 75 | Invention |
| 4-4 | 17 | 8 | 85 | Invention |
| 4-5 | 22 | 7 | 92 | Invention |
| 4-6 | 32 | 6 | 90 | Invention |
| 4-7 | 33 | 8 | 77 | Invention |
| 4-8 | 47 | 9 | 82 | Invention |
| 4-9 | 58 | 9 | 80 | Invention |
| 4-10 | 67 | 8 | 73 | Invention |
| 4-11 | A | 9 | 18 | Comparison |

-continued

| Sample No. | Dye | Photo-decoloring ability | Storage stability (%) | Remarks |
|---|---|---|---|---|
| 4-12 | B | 7 | 20 | Comparison |
| 4-13 | C | 3 | 95 | Comparison |
| 4-14 | D | 1 | 80 | Comparison |
| 4-15 | E | 1 | 85 | Comparison |
| 4-16 | F | 5 | 15 | Comparison |

The photo-decoloring dyes according to the invention showed excellent in both photo-decoloring ability and storage stability compared to the comparative photo-decoloring dyes.

What is claimed is:

1. A method for information recording comprising the step of exposing a photo-recording material to ultra violet radiation so that information is recorded on the photo-recording material, said photo-recording material comprising a compound represented by the following Formula (1),

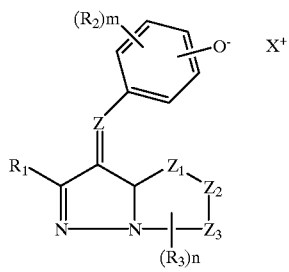

wherein $Z_1$, $Z_2$ and $Z_3$ each represents a carbon atom or a nitrogen atom, $R_1$, $R_2$ and $R_3$ each represents a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3.

2. The method of claim 1, wherein $Z_1$, and $Z_2$ represent a nitrogen atom, and $Z_3$ represent a carbon atom.

3. The method of claim 1, wherein $Z_1$ and $Z_3$ represent a nitrogen atom, and $Z_2$ represent a carbon atom.

4. The method of claim 1, wherein X represents a quaternary ammonium salt, an amidine salt, or a guanidine salt.

5. The method of claim 1, wherein a molecular weight of X is 120 to 1000.

6. The method of claim 1, wherein the sum of molecular weights of $R_1$, $R_2$ and $R_3$ is 150 to 1000.

7. The method of claim 1, wherein said compound is allowed to decolor according to the exposure of the photo-recording material to the ultra violet radiation.

8. The method of claim 7, wherein the photo-recording material comprises a support and a composition coated on the support, said composition comprising a binder and said compound.

9. The method of claim 1, wherein the sum of molecular weights of $R_1$, $R_2$ and $R_3$ is 600 to 850.

10. A positive image forming method comprising the following steps;

(a) preparing a photo-recording material containing a compound represented by the following Formula (1),

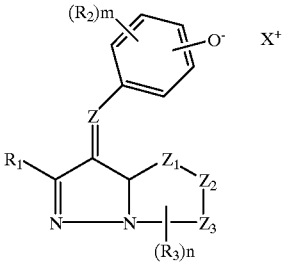

Formula (1)

wherein $Z_1$, $Z_2$ and $Z_3$ each represent a carbon atom or a nitrogen atom, $R_1$, $R_2$ and $R_3$ each represents a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3, (b) superposing a mask on said photo-recording material, and (c) exposing said photo-recording material on which said mask is superposed to ultraviolet radiation.

11. A photo-decoloring dye represented by the following Formula (1),

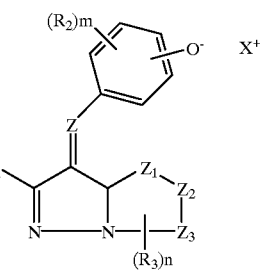

wherein $Z_1$, $Z_2$ and $Z_3$ each represents a carbon atom or a nitrogen atom, $R_1$, $R_2$ and $R_3$ each represents a hydrogen atom and substituents, $Z_2$ and $Z_3$ may form a condensed ring, Z represents N or CH, $X^+$ represents an organic cation, and the sum of molecular weights of X, $R_1$, $R_2$ and $R_3$ is 260 to 1000, m represents an integer of 0 to 4, n represents an integer of 0 to 3; and wherein the sum of molecular weights of $R_1$, $R_2$ and $R_3$ is 600 to 850.

* * * * *